(12) United States Patent
Dillon (10) Patent No.: US 12,335,781 B2
(45) Date of Patent: Jun. 17, 2025

(54) TRAFFIC SHAPING FOR HYBRID SATELLITE/TERRESTRIAL WIDE AREA NETWORKS

(71) Applicant: Hughes Network Systems, LLC, Germantown, MD (US)

(72) Inventor: Douglas Dillon, Germantown, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 423 days.

(21) Appl. No.: 18/155,875

(22) Filed: Jan. 18, 2023

(65) Prior Publication Data
US 2024/0073741 A1   Feb. 29, 2024

Related U.S. Application Data

(60) Provisional application No. 63/373,636, filed on Aug. 26, 2022.

(51) Int. Cl.
*H04W 28/08*   (2023.01)
*H04L 47/2408*   (2022.01)
*H04W 84/06*   (2009.01)

(52) U.S. Cl.
CPC ..... *H04W 28/0925* (2020.05); *H04L 47/2408* (2013.01); *H04W 84/06* (2013.01)

(58) Field of Classification Search
CPC ............. H04L 47/2408; H04L 47/283; H04W 28/0925; H04W 84/06
USPC .......................................................... 370/329
See application file for complete search history.

(56) References Cited

U.S. PATENT DOCUMENTS

| | | |
|---|---|---|
| 7,398,552 B2 | 7/2008 | Pardee et al. |
| 9,240,950 B2 | 1/2016 | Vedula et al. |
| 9,634,945 B2 | 4/2017 | Stevens et al. |
| 9,716,659 B2 | 7/2017 | Dillon |
| 9,832,131 B2 | 11/2017 | Vedula et al. |
| 9,832,169 B2 | 11/2017 | Border et al. |
| 10,044,620 B2 | 8/2018 | Dillon |
| 10,178,035 B2 | 1/2019 | Dillon |
| 10,637,782 B2 | 4/2020 | Dillon et al. |

(Continued)

FOREIGN PATENT DOCUMENTS

WO   2013085486 A1   6/2013

OTHER PUBLICATIONS

International Search Report for PCT Application No. PCT/US2023/072649.

*Primary Examiner* — Robert J Lopata
(74) *Attorney, Agent, or Firm* — Capitol City TechLaw; Jasbir Singh (57) ABSTRACT

A system and method for traffic shaping of a hybrid network using Internet Protocol (IP) including a first transport and a second transport, the method including: establishing an on-course line to monitor usage of the first transport over a usage cycle, wherein the on-course line defines a usage-limit of the first transport for a given instant within the usage cycle; tracking a current usage of the first transport over the usage cycle; determining a preference between the first transport and the second transport based on a property of a traffic to be transported by the hybrid network; and adjusting the preference to shift the traffic to the second transport as a distance of the current usage from the on-course line decreases for a current instant, wherein the first transport has a lower latency than a latency of the second transport.

20 Claims, 4 Drawing Sheets

(56) References Cited

U.S. PATENT DOCUMENTS

| | | | |
|---|---|---|---|
| 11,032,201 B2 | 6/2021 | Dillon | |
| 11,252,089 B2 | 2/2022 | Dillon | |
| 11,362,920 B2 | 6/2022 | Dillon | |
| 11,362,950 B2 | 6/2022 | Dillon | |
| 11,381,474 B1* | 7/2022 | Kumar | H04L 41/0897 |
| 11,381,511 B2 | 7/2022 | Chin et al. | |
| 2016/0198003 A1* | 7/2016 | Luft | H04L 67/63 |
| | | | 709/225 |
| 2017/0155590 A1* | 6/2017 | Dillon | H04L 12/2867 |
| 2019/0089623 A1* | 3/2019 | Dion | H04N 21/6131 |
| 2020/0112362 A1* | 4/2020 | Roy | H04B 7/18528 |
| 2020/0112363 A1* | 4/2020 | Roy | H04W 40/12 |
| 2020/0245210 A1* | 7/2020 | Fotheringham | H04L 45/08 |
| 2020/0296011 A1* | 9/2020 | Jain | H04L 43/20 |
| 2020/0382402 A1* | 12/2020 | Kolar | H04L 41/5025 |
| 2022/0210020 A1* | 6/2022 | Dillon | H04W 4/24 |
| 2022/0239589 A1* | 7/2022 | Uberoy | H04L 47/34 |
| 2023/0080537 A1* | 3/2023 | Ramanathan | H04L 47/2475 |
| | | | 709/238 |
| 2023/0107735 A1* | 4/2023 | Wang | H04L 67/02 |
| | | | 370/235 |
| 2023/0388151 A1* | 11/2023 | Dillon | H04L 12/2867 |
| 2023/0396538 A1* | 12/2023 | Kotrabasappa | H04L 45/42 |
| 2024/0129193 A1* | 4/2024 | Wang | H04L 41/16 |

* cited by examiner

```
┌─────────────────────────────────────────────────────────────────────────┐
│ Establishing an on-course line to monitor usage of the first transport  │
│ over a usage cycle, wherein the on-course line defines a usage-limit of │
│ the first transport for a given instant within the usage cycle 510      │
└─────────────────────────────────────────────────────────────────────────┘
                                    ▼
┌─────────────────────────────────────────────────────────────────────────┐
│    Tracking a current usage of the first transport over the usage       │
│                             cycle 520                                   │
└─────────────────────────────────────────────────────────────────────────┘
                                    ▼
┌─────────────────────────────────────────────────────────────────────────┐
│  Determining a preference between the first transport and the second    │
│  transport based on a property of a traffic to be transported by the    │
│                         hybrid network 530                              │
└─────────────────────────────────────────────────────────────────────────┘
                                    ▼
┌─────────────────────────────────────────────────────────────────────────┐
│  Adjusting the preference to shift the traffic to the second transport  │
│  as a distance of the current usage from the on-course line decreases   │
│                      for a current instant 540                          │
└─────────────────────────────────────────────────────────────────────────┘
```

FIG. 5  ⟵ 500

```
┌─────────────────────────────────────────────────────────────────────────┐
│  Inspecting the downstream packets for the downstream IP flow with a    │
│  deep packet inspector to determine a category and an application       │
│  group for the downstream packets 610                                   │
└─────────────────────────────────────────────────────────────────────────┘
                                    ▼
┌─────────────────────────────────────────────────────────────────────────┐
│  Tagging the downstream packets with a downstream tag based on the      │
│                category and the application group 620                   │
└─────────────────────────────────────────────────────────────────────────┘
                                    ▼
┌─────────────────────────────────────────────────────────────────────────┐
│    Receiving, at a SD-WAN router, a downstream tag for downstream       │
│              packets of a downstream IP flow 630                        │
└─────────────────────────────────────────────────────────────────────────┘
                                    ▼
┌─────────────────────────────────────────────────────────────────────────┐
│   Identifying an upstream IP flow corresponding to the downstream IP    │
│                              flow 640                                   │
└─────────────────────────────────────────────────────────────────────────┘
                                    ▼
┌─────────────────────────────────────────────────────────────────────────┐
│  Classifying upstream packets of the upstream IP flow with an upstream  │
│         tag based on the downstream tag of the downstream IP flow 650   │
└─────────────────────────────────────────────────────────────────────────┘
                                    ▼
┌─────────────────────────────────────────────────────────────────────────┐
│  Determining a preferred transport, for transmitting the upstream       │
│  packets, between the first transport or the second transport based on  │
│                        the upstream tag 660                             │
└─────────────────────────────────────────────────────────────────────────┘
                                    ▼
┌─────────────────────────────────────────────────────────────────────────┐
│  Setting a Class-of-Service (COS) classification for the upstream IP    │
│                   flow based on the upstream tag 670                    │
└─────────────────────────────────────────────────────────────────────────┘
                                    ▼
┌─────────────────────────────────────────────────────────────────────────┐
│  Determining a preferred transport, for transmitting the upstream       │
│  packets, between the first transport or the second transport based on  │
│  the COS classification and measured usages of one or both of the       │
│                          transports 680                                 │
└─────────────────────────────────────────────────────────────────────────┘
```

TRAFFIC SHAPING FOR HYBRID SATELLITE/TERRESTRIAL WIDE AREA NETWORKS

CROSS-REFERENCE TO RELATED APPLICATIONS AND INCORPORATION BY REFERENCE

The present application claims the benefit under 35 U.S.C. 119(e) of U.S. Provisional Application Ser. No. 63/373,636, filed Aug. 26, 2022, which is incorporated herein by reference in its entirety.

FIELD

The present teachings track a higher-cost transport's usage across a usage cycle in a hybrid networking setting to estimate whether the subscriber is on-course to exceed a usage cycle usage limit. The hybrid network includes a high-cost per GB lower-latency transport and a lower-cost per GB higher-latency transport. The relative amount of usage on the two transports is adjusted to avoid exceeding a cycle's usage limit while retaining as responsive a service as practical given the higher-cost transport's usage relative to its cycle limit.

While managing the two types of transports existing Internet and Virtual Private Network (VPN) networking may be optimized or improved to provide a Quality-Of-Service (QoS) Overlay supporting multiple classes of services across the transports even when one or more of the transports is without QoS support. The present teachings provide Software-Defined Wide Area Networking (SD-WAN) for the multiple (typically two) transports. The transports may be combined to provide better service and availability than what is provided by either transport individually and where a given IP flow's packets can, based on policy settings, be shifted from one transport to another or, when it makes sense, to be carried simultaneously over both transports. The transports may be provided by disparate Wide-Area Networks, for example, a satellite WAN and a terrestrial WAN.

BACKGROUND

In prior art multiple transport implementations, prior art multiple transport implementations do not manage and control the per-GB usage costs of the multiple transports. Some prior art routers have fixed routes and load balancing for traffic. When traffic switches over, existing connections are cut and need to be re-established as the IP path routing has changed. Also, subscriber traffic does not take advantage of both transports and their relative benefits.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

By trading off and optimizing lower-latency and higher-latency network usage, an improved service is provided in an environment where the average lower-latency usage per user is fixed and saving satellite bandwidth is beneficial by when excess lower-latency capacity is available. A framework for tracking usage accompanied by a set of configurable traffic shaping options guides the tradeoff between usage of satellite and lower-latency transports on a per application (and within a given application) basis.

In some aspects, the techniques described herein relate to a method for traffic shaping of a hybrid network using Internet Protocol (IP) including a first transport and a second transport, the method including: establishing an on-course line to monitor usage of the first transport over a usage cycle, wherein the on-course line defines a usage-limit of the first transport for a given instant within the usage cycle; tracking a current usage of the first transport over the usage cycle; determining a preference between the first transport and the second transport based on a property of a traffic to be transported by the hybrid network; and adjusting the preference to shift the traffic to the second transport as a distance of the current usage from the on-course line decreases for a current instant, wherein the first transport has a lower latency than a latency of the second transport.

In some aspects, the techniques described herein relate to a method, wherein the first transport is provided by a cellular Wide Area Network (WAN) and the second transport is provided by a satellite WAN.

In some aspects, the techniques described herein relate to a method, wherein the establishing establishes a plurality of knob levels to calculate a distance of the current usage from the on-course line.

In some aspects, the techniques described herein relate to a method, wherein the determining the preference is based on a usage of the first transport.

In some aspects, the techniques described herein relate to a method, wherein the determining the preference is based on one or more of a path selection policy, a Class-of-Service (COS), an application identification, an application group policy, and a COS policy.

In some aspects, the techniques described herein relate to a method, wherein the determining the preference is based on a path selection policy.

In some aspects, the techniques described herein relate to a method, wherein the determining the preference is based on a Class-of-Service (COS) classification.

In some aspects, the techniques described herein relate to a method, wherein the determining the preference is based on a COS policy.

In some aspects, the techniques described herein relate to a method, wherein the determining the preference is based on an application identification.

In some aspects, the techniques described herein relate to a method, wherein the determining the preference is based on an application group policy.

In some aspects, the techniques described herein relate to a method, wherein the hybrid network includes a first Virtual Private Network (VPN) over the first transport and a second VPN over the second transport, and the determining the preference is based on a VPN path preference policy for the first VPN and the second VPN.

In some aspects, the techniques described herein relate to a method, wherein the adjusting of the preference is based on a knob level determined based on a distance of the current usage from the on-course line.

In some aspects, the techniques described herein relate to a method, wherein the adjusting sets the preference to the second transport when the current usage exceeds the on-course line for the current instant.

In some aspects, the techniques described herein relate to a method, wherein the adjusting the preference includes adjusting a rate limit of the first transport.

In some aspects, the techniques described herein relate to a method, wherein the adjusting the preference is based on a direction of the traffic.

In some aspects, the techniques described herein relate to a method for traffic shaping of a hybrid network using Internet Protocol (IP) including a first transport and a second transport, the method including: receiving, at a SD-WAN router, a downstream tag for downstream packets of a downstream IP flow; identifying an upstream IP flow corresponding to the downstream IP flow; and classifying upstream packets of the upstream IP flow with an upstream tag based on the downstream tag of the downstream IP flow.

In some aspects, the techniques described herein relate to a method, wherein the receiving receives the downstream tag from a SD-WAN gateway.

In some aspects, the techniques described herein relate to a method, wherein the SD-WAN gateway adjusts the downstream tag by: inspecting the downstream packets for the downstream IP flow with a deep packet inspector to determine a category and an application group for the downstream packets; and tagging the downstream packets with a downstream tag based on the category and the application group.

In some aspects, the techniques described herein relate to a method, further including determining a preferable transport, for transmitting the upstream packets, between the first transport or the second transport based on the upstream tag.

In some aspects, the techniques described herein relate to a method, further including: setting a Class-of-Service (COS) classification for the upstream IP flow based on the upstream tag; and determining a preferable transport, for transmitting the upstream packets, between the first transport or the second transport based on the COS classification and measured usages of one or both of the first transport and the second transport.

Additional features will be set forth in the description that follows, and in part will be apparent from the description, or may be learned by practice of what is described.

DRAWINGS

In order to describe the manner in which the above-recited and other advantages and features may be obtained, a more particular description is provided below and will be rendered by reference to specific embodiments thereof which are illustrated in the appended drawings. Understanding that these drawings depict typical embodiments and are not, therefore, to be limiting of its scope, implementations will be described and explained with additional specificity and detail with the accompanying drawings.

FIG. 5 is a flowchart of a method for traffic shaping of a hybrid network using IP including a first transport and a second transport, according to various embodiments.

FIG. 6 is a flowchart of a method for traffic shaping of a hybrid network using IP including a first transport and a second transport, according to various embodiments.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The present teachings may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in a computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that a block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, a block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that a block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present disclosure, as well as other variations thereof, means that a feature, structure, characteristic, and so forth described in connection with the embodiment is included in at least one embodiment of the present disclosure. Thus, the appearances of the phrase "in one embodiment" or "in an embodiment", as well any other variations, appearing in various places throughout the specification may not refer to the same embodiment.

The present teachings track a higher-cost transport's usage across a usage cycle in a hybrid networking setting to estimate whether the subscriber is on-course to exceed a usage cycle usage limit, when the hybrid network includes a high-cost per GB lower-latency transport and a lower-cost per GB higher-latency transport. The relative amount of usage on the two transports is adjusted to avoid exceeding a cycle's usage limit while retaining as responsive a service as practical given the higher-cost transport's usage relative to its cycle limit.

An improved service is possible by trading off and optimizing a lower-latency network and a higher-latency network usage where the average lower-latency network usage per user cost is fixed on the lower-latency network. The low-latency bandwidth may be treated as a scarce resource that is being saved for carrying responsiveness sensitive traffic, for example, interactive traffic. However, it may benefit a higher-latency service provider to consume all paid for low-latency bandwidth capacity (without exceeding or leaving too much unconsumed bandwidth). Examples of a lower-latency network include a 4th generation (4G) mobile communications standard network like Long Term Evolution (LTE). Examples of a higher-latency network include a High Thruput Satellite (HTS) network. A basic framework may be used for tracking usage and implementing a set of configurable traffic shaping options to balance the tradeoff between satellite and LTE on a per application (and within a given application) basis. The basic framework can be guided to provide consistent results thru a usage cycle of the lower-latency network. For the adjusting of traffic shaping and path selection based on usage and unconsumed bandwidth of the lower-latency network, a hybrid network provides an improved service for a usage cycle.

A subscriber's higher-cost transport usage is characterized as being in one of a set of N (default=6) usage knob levels (ranges). In some embodiments, the higher the usage knob level, the more usage is switched to the lower-cost transport. In some embodiments, the different usage knob levels may utilize different sets of configurable techniques. In some embodiments, the techniques may be visualized as Christmas Tree ornaments being attached (and configured) to operate according to the usage knob level. Exemplary configurable techniques, without limitation, include one or more of:

Adjusting a bit rate limit at which traffic is permitted thru the higher-cost transport upstream and downstream.
    Adjusting a transport path preference policy for various application categories based on their identification by a deep-packet inspection classifier.
    Adjusting classifier path preference rule settings depending on the usage knob level.

Adjusting a VPN classifier's path preference rule settings depending on the usage knob level.

Introductory Example

A hybrid network may combine a High-Thruput Satellite (HTS) WAN transport and an LTE WAN transport to provide responsive, high-thruput and cost-effective broadband access to underserved locations with at least some terrestrial wireless connectivity. For example, a subscriber of the hybrid network may have an LTE usage limit of 20 GB/month along with a service plan-based overall usage limit such as 50 or 100 GB. In this example, the usage cycle is per month and the associated usage limit per usage cycle is also monthly.

The LTE service may be pooled at 20 GB/month for a subscriber where a pooled service month coincides with the start of a usage cycle. For example, if the hybrid network has 10,000 subscribers, those subscribers, as a whole, can use 20,000 GB of LTE data with no particular limit on any specific subscriber in the usage cycle. The pool may be a use-it-or-lose it pool, i.e., there is no rollover of leftover bandwidth from one month to the next. As such, there is one LTE pool for the hybrid network subscribers.

A SD-WAN gateway on the hybrid network carries and shapes a subscriber's traffic, especially, its downstream traffic. The SD-WAN gateway along with a SD-WAN router may be responsible for monitoring a subscriber's month-to-date usage and initiating Fair-Access Policy (FAP) rate limitations when the overall monthly limit is exceeded. The SD-WAN router (disposed at the subscriber site) may be responsible for monitoring the subscriber's approximate LTE usage and guiding that measured usage to approach but not exceed a configurable monthly limit. In some embodiments, the LTE provider may be responsible for precisely tracking individual and overall LTE usage and reporting it on a daily basis.

The exemplary hybrid network may define 6 knob usage levels and associated policies. The different usage knob settings may implement the following policies:

| No. | Short Desc | Description |
|---|---|---|
| 1 | Max LTE Usage | Use up excessive LTE capacity to save HTS capacity. LTE operates with unlimited upper bound on its rate limiters (target bit rate). Knob level 1 may be unused if active usage of LTE is not desired. |
| 2 | Reduced LTE 3 | Reduce LTE usage by apps where end-user performance is not noticeably affected (e.g. streaming video, bulk downloads, doorbell uploads) over HTS. LTE operates with unlimited upper bound on its rate limiters (target bit rate). |
| 3 | Reduced LTE 2 | Further reduce LTE usage by apps where end-user performance is seldom impacted (e.g. group virtual meetings go downstream HTS) or where the savings is big (Heavy Interactive Gaming downstream goes HTS). LTE operates with 512 kbps down, 1024 kbps up upper bound on its rate limiters (target bit rate) beginning with this knob setting. |
| 4 | Reduced LTE 1 | Further reduce LTE usage by having lower priority apps (e.g. two-party real-time communications) go downstream HTS. |
| 5 | HTS Downstream | Lessen LTE usage by running downstream traffic over HTS. |
| 6 | HTS Only | Run traffic via HTS lowering LTE usage |

A network engineer of the hybrid network may monitor the pool's month-to-date LTE usage and adjusting the subscriber's configurable monthly LTE usage limit to avoid pool bandwidth overages and excessive under usage. The network engineer may adjust LTE traffic management's configuration to optimize the end-user experience.

A service plan may support additional traffic management capabilities. In some embodiments, the service plan may support tokens that grant a subscriber additional bandwidth beyond their monthly limit. In some embodiments, the service plan may support Bonus Time and Bonus Time Usage Limits that grant a subscriber usage beyond his monthly limit during service plan morning hours when the satellite link is underused, and a use of the LTE is lessened. The service plan may support a Service Suspension mode where the LTE service disconnects and routes end-user traffic, optionally without tunneling traffic between the SD-WAN router and gateway, thru the VSAT bypassing the LTE Traffic Management. In some embodiments, the bypassing may limit the reachable destinations available, for example, to destinations that permit interactions with the service provider.

Introduction

A system and method for managing the usage of a lower-latency higher-cost per-GB transport in a hybrid network involving: a lower-cost per-GB higher-latency transport operating in conjunction with a higher-latency transport to avoid excessive higher-cost usage without exceeding a usage cycle. The usage cycle may coincide with a billing cycle of the lower-latency transport or a billing cycle of the hybrid network. Other time periods for a usage cycle may be used, while providing the end-user with an improved service.

High Throughput Satellite (HTS) systems using geosynchronous satellites are capable of delivering over 200 Mbps throughput from a ground station to end user terminal; however, the packet round trip latency for a geosynchronous satellite system is at least 480 milliseconds. Despite the high availability, broad coverage, and high throughput of HTS, secure webpage and highly interactive traffic response times over satellite tends to be longer compared to lower throughput, lower latency terrestrial systems due to the long round trip delay over satellite and the number of round-trip interactions used by modern end user applications. For example, a cellphone 4G or 5G service may be used as a lower-latency transport and a satellite (geosynchronous, low-earth or mid-earth) transport may be used as the higher latency transport.

Hybrid connectivity solutions using multiple transports can be used to provide responsive, high-performance and cost-effective networking to locations where wired (cable and fiber) connections are unavailable. Being able to effectively combine multiple transports, for example, a lower-cost per GB, higher download speed geosynchronous satellite transport with a higher-cost per GB lower latency wireless (e.g. 4G or 5G) or low-earth-orbit satellite transport could provide a more responsive, higher speed and lower-cost service than can be achieved by a single such transport. Wireless (e.g. 4G or 5G cellular technology based) transports provide lower-latency connectivity but with a lower download speed and probably at a higher cost per-GB than an HTS transport.

In an embodiment, the present teachings use an SD-WAN router is connected to two or more transports. One of the transports includes a high throughput, higher latency geosynchronous satellite transport, and another of the transports includes a lower-latency wireless 4G or 5G transport. An SD-WAN gateway facilitates IP communications between devices accessible by the SD-WAN router and devices accessible by the SD-WAN gateway. SD-WAN tunnels, thru each of the transports, may be established between the SD-WAN router and SD-WAN gateway and policies in the router and gateway can cause an end-user IP flow's packets to be shifted from one tunnel to another on a policy basis. A far end of the tunnels (the SD-WAN router or Gateway) may put an IP flow's packets back in sequence prior to forwarding them to their destination and protocol.

In some embodiments, the SD-WAN router and SD-WAN gateway include a classifier function to determine the path preference for an IP flow's packets and to set the class of service for the Quality-Of-Service prioritization of end-user IP flow packets that the SD-WAN router and SD-WAN gateway provide. The classifier can adjust both the path preference and priority of the IP flow over the course of time.

The usage (the amount of traffic measured in bytes) carried by a measured transport of the transports is monitored and the path-selection policy applied to the end-user IP flows is adjusted based on the amount of usage. In some embodiments, the lower-latency transport is the measured transport. The path-selection policy adjustments advance the lower-latency transport's usage close to, without exceeding a usage target for the usage cycle, to consistently give an end-user as good as practical responsiveness experience over a usage cycle. In some embodiments, the lower-latency transport's usage is tracked over the course of the usage cycle against a monotonically non-decreasing function, for example, an on-course line. In some embodiments, a straight line may be used to define the on-course line. In some embodiments, a non-straight line may be the on-course line or the monotonically non-decreasing function. In one embodiment, the on-course line extends over the course of the usage cycle and aims to end at the usage target for the end of the usage cycle.

The lower-latency transport's usage relative to the on-course line may be divided into a set of N (default=6) usage knob levels. An end-user may be associated with a respective current usage knob level. The path-selection policies applied to end-user IP flows are at least in part based on an end-user's current usage knob level. The path-selection policies are provisioned/expected to reduce usage of the lower-latency transport as the knob level increases.

In one embodiment, the path-selection policy manages the lower-latency transport's usage to not exceed a usage target over a period of time. In some embodiments, the path-selection policy manages the lower-latency transport's usage as a sliding window encompassing a configurable fraction of overall usage. In some embodiments, the path selection policy may establish the current usage as being in one of a set of N (default=6) usage knob levels where the path selection policies applied an end-user IP flows are influenced by the usage knob level. In some embodiments, a usage knob level may include a set of usage thresholds. The thresholds may depend on a duration between the current date and time, and an end of the usage cycle. The thresholds may depend on usage over a sliding window of time.

In some embodiments, the present teachings may select the path of an IP flow based upon the current usage knob level. In some embodiments, a rate limit imposed on the lower-latency transport may be lowered as the usage knob level increases.

In some embodiments, the transport path preference policy for identified application categories may be adjusted. The application category identification may be performed by a deep-packet inspection classifier. A given application category's policy may vary with the usage knob level and is set to reduce a varying set of application categories lower-latency transport usage as the usage knob level increases.

In some embodiments, the transport path preference policy for an IP flow may be adjusted based on a classifier's evaluation of what the flow is carrying at the protocol level and the current usage knob level reducing the amount of traffic carried as the usage knob level increases. In some embodiments, the transport path preference policy for an IP flow may be adjusted based on adjusting a VPN classifier's path preference policy to reduce the amount of traffic carried as the usage knob level increases.

Lower-Latency Traffic Management

Figure 1:
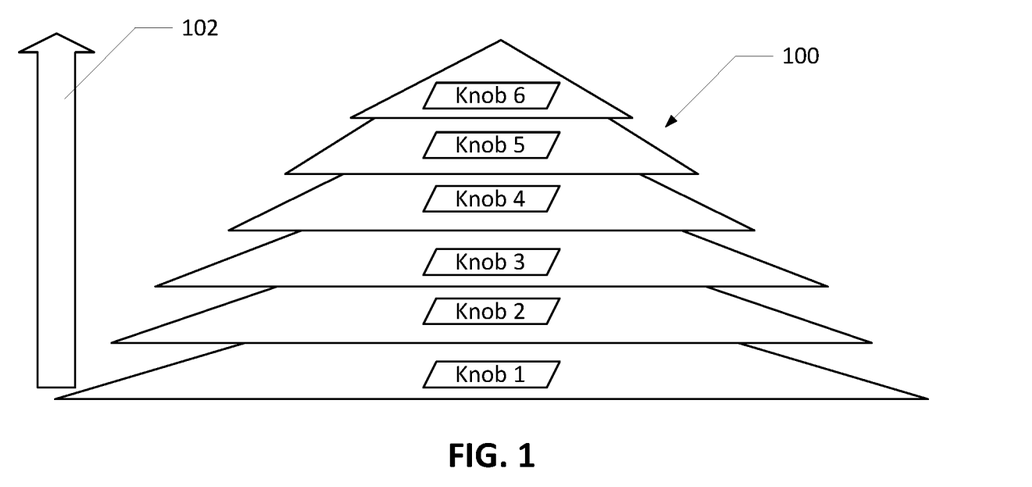
FIG. 1 illustrates the transport path preference policies depicted as a Christmas Tree, according to various embodiments.

FIG. 1 illustrates the transport path preference policies depicted as a Christmas Tree, according to various embodiments.

In FIG. 1, layers on a Christmas tree 100 correspond to a knob level. In the Christmas tree 100 layers nearer the treetop correspond to a falling usage level 102 of a lower-latency transport. As such, a narrowing of the Christmas tree 100 represents a decreased usage of the lower-latency transport as the knob level increases. Christmas Tree ornaments (not shown) on the Christmas tree 100 may represent policies, techniques and settings that apply to the respective knob level.

Figure 1A:
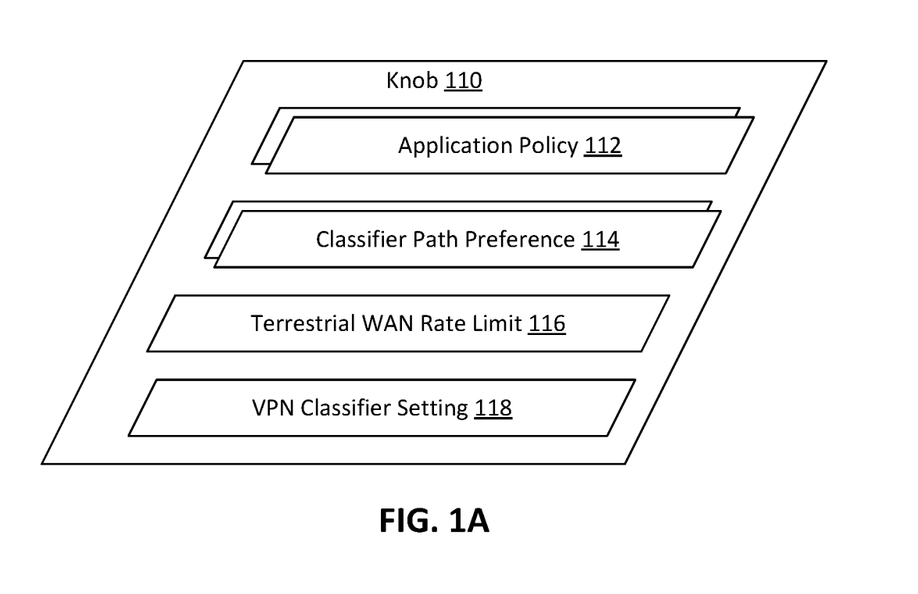
FIG. 1A illustrates policies, techniques and settings for a knob level, according to various embodiments.

FIG. 1A illustrates policies, techniques and settings for a knob level, according to various embodiments.

A knob level of the Christmas tree 100 may be associated with a decoration 110 associated with a respective knob level. The decoration 110 may include policies, techniques and settings for the respective knob level. Exemplary policies, techniques and settings include an application policy 112 (multiple per knob setting), classifier path preference rules 114 (multiple per knob setting), a lower-latency transport rate limit 116 (one per knob setting) and VPN classifier settings 118.

A Christmas tree "ornament" is a configuration setting, one configuration per-usage knob setting basis, that adjusts what kind of traffic is carried via lower-latency transport. Exemplary different classes of "ornaments" include Application Policies, Classifier Path Preference Rules, lower-latency transport Rate Limit Upper Bound Settings, VPN Classifier Settings, and Microsoft Teams Settings.

In some embodiments, the usage governor may use a non-decreasing function, for example, an on-course line, to monitor a usage of a measured transport, such as, the lower-latency transport. In some embodiments, the usage governor may include a grace period of time at the beginning of the usage cycle or some other way of allowing greater usage at the start of the usage cycle rather than an above zero Y intercept for the on-course line.

A subscriber's usage-cycle-to-date usage may be categorized by into one of six usage knob settings of increasing usage of the lower-latency transport. For example, knob usage level 1 indicates the subscriber is not using much of the lower-latency transport and may utilize lower-latency transport even when it does not help end-user responsiveness. In contrast, knob usage level 6 indicates that the subscriber is "on-course" to exceed the subscriber's usage-cycle-lower-latency transport usage budget and use of lower-latency transport as there may be overage charges associated with exceeding the target.

Figure 2:
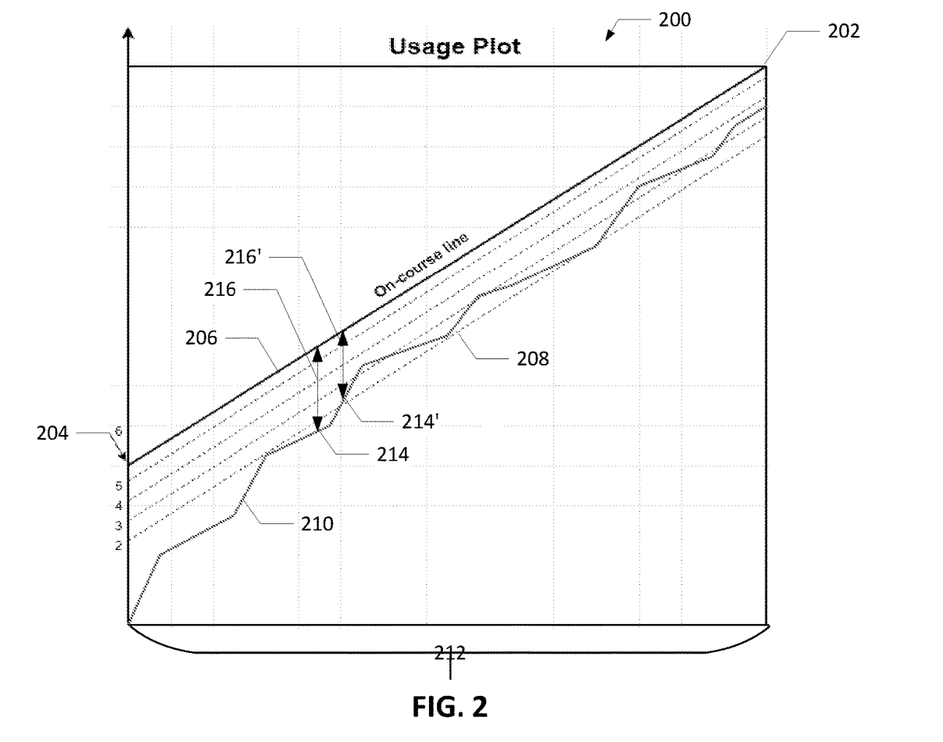
FIG. 2 illustrates a usage plot for a subscriber according to various embodiments.

FIG. 2 illustrates a usage plot for a subscriber according to various embodiments.

FIG. 2 illustrates a usage plot 200 for a subscriber. The vertical axis of the usage plot 200 may be megabytes and the horizontal axis of the usage plot 200 may in days. A current usage 210 over the course of a usage cycle 212 is tracked by the usage monitor by comparing the current usage 210 to an on-course line 206. The on-course line 206 may extend from a usage-cycle-start instant 204 to a usage-cycle-end instant 202. The on-course line 206 may start somewhere above zero thereby providing a subscriber with an improved service for a "grace period" at the beginning of a usage cycle. At the usage-cycle-start instant 204, the on-course line 206 may have a non-zero value. The non-zero value may avoid penalizing a subscriber at beginning period of the usage cycle 212. At the usage-cycle-end instant 202, the on-course line 206 may be set to a upper limit usage of the lower-latency network allowed for a subscriber.

In exemplary embodiments, the usage cycle 212 may be a month in duration starting, for example, on the 1st of the month. Embodiments may use alternative durations and start times for the usage cycle 212.

Figure 3:
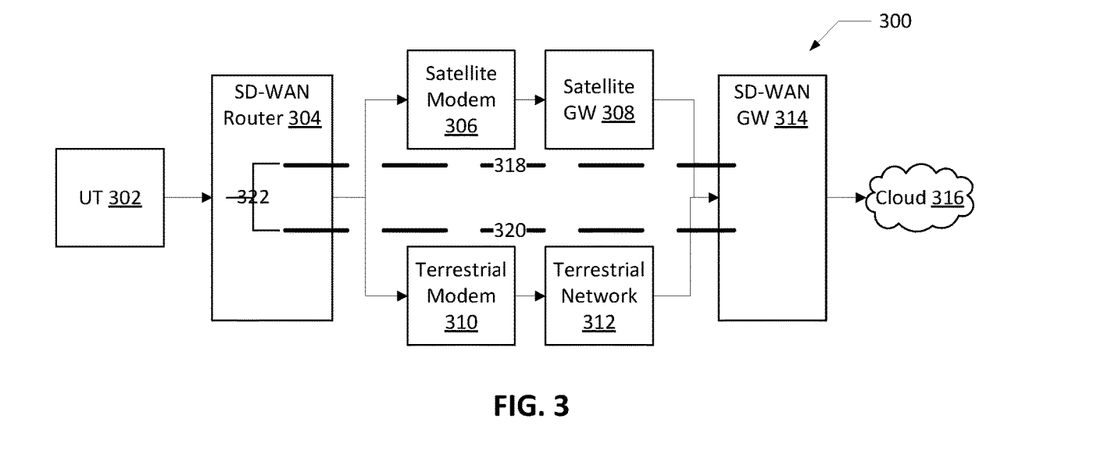
FIG. 3 illustrates a logical view of a hybrid network system according to various embodiments.
Figure 3A:
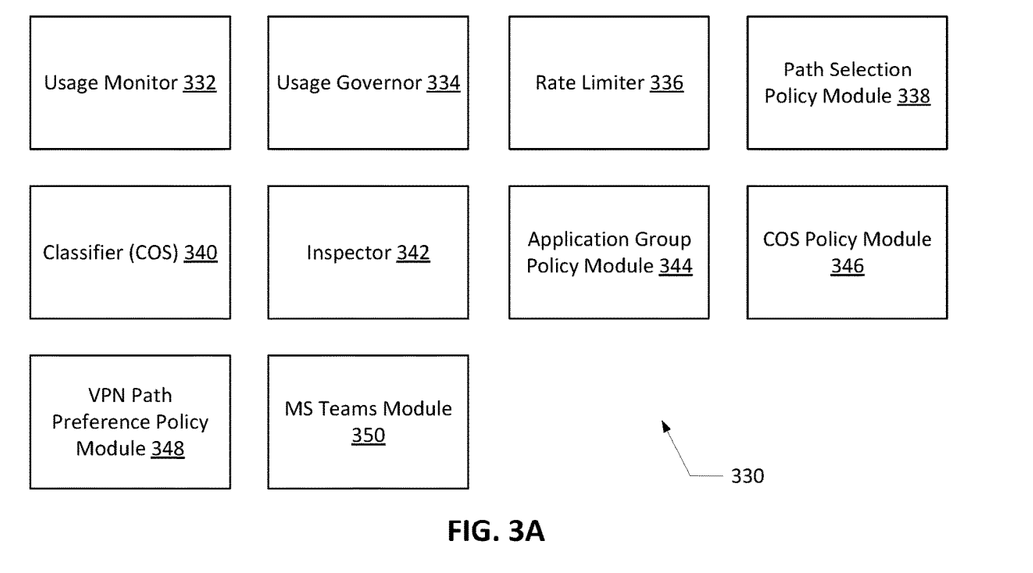
FIG. 3A illustrates a block diagram of a SD-WAN device according to various embodiments.

A usage governor, for example, usage governor 334 of FIG. 3A, maintains a current Usage Knob setting based on the current usage 210 relative to the on-course line 206 for a given instant. The Usage Governor may periodically compare the current usage 210 to a corresponding level of the on-course line 206 for the current time within the usage cycle. In one embodiment the usage knob level thresholds are a percentage on the usage cycle limit. The percentage calculates how much a usage cycle's limit has been consumed by the subscriber or usage-cycle-percent=100*(data used in usage cycle to date)/(usage cycle limit).

As usage nears the on-course line 206 a knob level may increase resulting is less usage over time allowing the knob level to shift back to a lower level. In some embodiments, the usage governor may include a knob-level-on-course line 208. The knob-level-on-course line 208 may allow for evaluating and setting a value for a current knob level. For at any point in time in a usage cycle, there is an On-Course-Usage-Percent based on the Y-value of the on-course line 206 for that time. The lower-latency transport usage knob setting, at any point in time, is based on a difference between the On-Course-Usage-Percent and a Usage-Cycle-To-Date Usage Percent. A usage knob setting may have a configurable threshold (for example, in units of percent) and how the current lower-latency transport Usage Knob is that of the highest threshold exceeded by a difference between the On-Course-Usage-Percent and the Usage-Cycle-To-Date Usage Percent.

For example, at a current usage for instant 214, the current knob level may be changed/set to 2 based on a distance 216. The distance 216 is above an on-course-line-for-knob-level 2. The distance 216 may be calculated as the distance between the on-course line 206 and the current usage 210 at instant 214. The knob level at instant 214 may be set to 2 as it is above a threshold usage for knob level 2. When the cycle instant approaches instant 214', the associated distance 216' the current knob level may be changed/set to 3, as the distance 216' between the on-course line 206 and the current usage 210 at instant 214' is above an on-course-line-for-knob-level-3. The distance 216' may be calculated as the distance between the on-course line 206 and the current usage 210 at instant 214'. The knob level at instant 214' may be set to 3 as it is above a threshold usage for knob level 3.

System Architecture

FIG. 3 illustrates a logical view of a hybrid network system according to various embodiments.

FIG. 3 illustrates an exemplary block diagram of a system 300 of an SD-WAN setup using higher-latency and lower-latency transports. While the example of FIG. 1 and other examples herein involve two specific network transports, e.g., HTS and LTE, other physical network access technologies or network transports may be used. Any combination of these and other network transports may be used. In some cases, the techniques can be used with multiple instances of the same type of network transport, for example, to provide load balancing among two network connections of the same type (e.g., two different cellular connections).

The system includes a UT 302 (User Terminal) connected to a SD-WAN router 304 (Software Defined-Wide Area Network router) that communicates with a cloud 316 via a SD-WAN gateway 314. The public Internet is an example of a cloud. Alternatively, a private network is an example of a cloud. The SD-WAN router 304 and SD-WAN gateway 314 are connected via a higher-latency transport 318 and a lower-latency transport 320, referred to jointly as, transports 322. Traffic for the higher-latency transport 318 traverses a satellite modem 306 and a satellite gateway 308. Traffic for the lower-latency transport 320 traverses a terrestrial modem 310 and a terrestrial network 312.

Traffic from the terrestrial network 312 and/or the satellite gateway 308 to the SD-WAN gateway 314 may traverse the Internet (not shown). In some embodiments, the satellite gateway 308 and the SD-WAN gateway 314 may be co-located and traffic between the satellite gateway 308 and SD-WAN gateway 314 may not traverse the Internet. In some embodiments, the SD-WAN gateway 314 may be co-located with a network device of the terrestrial network 312 and traffic between the terrestrial network 312 and SD-WAN gateway 314 may not traverse the Internet.

The concurrent use of the transports 322 can be transparent to the UT 302 and devices on the cloud 316. The management of the transports 322 is done by the SD-WAN Router 304 and the SD-WAN Gateway 314 as discussed below. In some embodiments, the SD-WAN Router 304 and the SD-WAN Gateway 314 may utilize tunnels over the transports 322; at least one tunnel for the transports 322.

The SD-WAN Router and SD-WAN gateway 314 evaluate a subscriber's current knob level, packets and network conditions to select from the transports 322 for a packet or group of packets. For example, the SD-WAN Router 304 can classify packets to specify the classes of service (e.g., levels of latency) needed for each packet, select the appropriate of the transports 322 given the class of service and then refine the selection based on the subscriber's current knob level. The SD-WAN Router 304 then sends packet to the SD-WAN Gateway 314 using the refined selected transport for the packet, and the SD-WAN Gateway 314 sends the packets on to the cloud 316. A similar, complementary process is used to transmit data on the return direction from the SD-WAN Gateway 314 to the SD-WAN Router 304 and back to the UT 302. As a result, the SD-WAN Router 304 and SD-WAN Gateway 314 can concurrently use available transports 322 to achieve the advantages of the available transports 322.

Collectively the SD-WAN Router, the satellite modem and the wireless modem are referred to as a satellite Terminal (or more simply, the Terminal) herein. Various embodiments of the satellite terminal include integrating the functionality of the SD-WAN Router, the satellite modem and the wireless modem into a fewer collection of functional units such as having the three reside within an integrated hardware equipment.

The SD-WAN Router 304 and SD-WAN Gateway 314 together implement SD-WAN policies that provide for identifying and classifying unidirectional IP flows based on various properties associated with the IP flows and then selecting which of the transports 322 may carry a given packet. The transports 322 can concurrently support transfers for many different connections, including for connections between different LAN hosts. The policy's selection of the transports 322 to carry an IP flow's packets can shift over time, for example, based on their usage. Exemplary properties include type of IP flow, direction of flow, COS classification, and the like. Policies may include having the initial startup of a connection including its initial handshakes and key exchange and its initial request (as in an HTTPS connection) be carried via the low latency transport while shifting the rest of the connection to the longer latency transport after the initial startup is complete or after enough traffic has been carried to categorize the connection as carrying bulk traffic. The policies may be guided based on the protocol, IP addresses and port numbers used as well as deep inspection of packets to pull out the server domain name. The policies may be further guided by packet size and frequency as a way of estimating the application being carried (e.g. interactive traffic, VOIP traffic or bulk download or upload).

After traffic is assigned, the SD-WAN Router 304 and SD-WAN Gateway 314 can periodically re-evaluate the assignment. In some cases, the re-evaluation occurs periodically, for example, after a predetermined interval of time or after a predetermined amount of data for the connection or IP flow is received or transmitted. In some implementations, the SD-WAN Router 304 and SD-WAN Gateway 314 may each evaluate data to be transmitted on an individual packet-by-packet basis or as groups of packets. As a result, as incoming packets of a connection are received, an individual packet or group of packets may be newly evaluated in view of current network conditions (including the queue depths of the transports 322).

FIG. 3A illustrates a logical view of an exemplary SD-WAN device according to various embodiments.

FIG. 3A illustrates an SD-WAN device 330. The SD-WAN device 330 may include logic blocks including a usage monitor 332, a usage governor 334, a rate limiter 336 (typically applied to rate limit usage of the lower-latency transport), a path selection policy module 338, a classifier (COS) 340, an inspector 342, an application group policy module 344, a COS policy module 346, an VPN path preference policy module 348, and an MS Teams module 350. An SD-WAN router and a SD-WAN gateway may include any or all of the logic blocks illustrated in FIG. 3A.

The usage monitor 332 may collect statistics and usages of the transports. In some embodiments, the lower-latency transport provider may provide statistics and usages for the LAN.

The MS Teams module 350 may estimate the type of Microsoft Teams traffic an IP flow is carrying and allow the transport carrying that traffic to be directed to one transport or the other. This also is configurable on a per-usage knob setting basis.

Usage Governor—Lower-latency Usage Governor

In one embodiment the SD-WAN router has a lower-Latency WAN Usage Governor (referred to here-in-after as simply the Usage Governor). In alternative embodiments this functionality may reside in the SD-WAN Gateway or in both the SD-WAN router and the SD-WAN Gateway or elsewhere in the system. With appropriate settings, as the Usage Knob increases the rate of lower-latency WAN usage falls. The result is that the Usage Governor and the Usage Knob setting: governs lower-latency transport usage to stay within a lower-latency transport service plan usage cycle limit; maintains a good user experience and limits end-of-usage-cycle poor performance due to the limit being exceeded.

In one embodiment the Usage Governor receives Lower-latency transport Usage measurements (in bytes) from the SD-WAN Router. In alternative embodiments the usage measurements may be provided from elsewhere including other measurement points in the system or from the Lower-latency transport service provider.

Rate Limiter—Adjustable Lower-Latency Transport Rate Limit

One way to reduce lower-latency transport usage is to reduce the allowable rate (the rate limit or target bit rate) that it is allowed to carry traffic. Generally, this value is unlimited for lower knob settings and is decreased with the knob level. The SD-WAN Router and SD-WAN Gateway may be equipped with a Lower-latency transport Rate Limiter (referred to further in this section simply as Rate Limiter) to limit the speed for transmissions across the Lower-latency transport.

In some embodiments, the SD-WAN Router and SD-WAN Gateway may track the capacity of the transports and may prioritize traffic by having a rate-limited priority queue for different classes of traffic. In some embodiments, the SD-WAN Router and SD-WAN Gateway may implement a policy to select, for a given packet's class of service priority, the path estimated to have the lower latency.

In some embodiments, the Rate Limit is controlled as function of the Usage Knob setting where the allowable Rate has an upper bound that is a function of the Usage Knob and which decreases at various Usage Knob settings. This has the effect of reducing lower-latency transport usage.

Path Selection Policy Module—Path Preference Policies

The SD-WAN Router and SD-WAN Gateway may assign an IP flow a path-preference policy which may vary over time. The policies may include one or more of:

Prefer Lower-latency transport—carried by the Lower-latency transport except when that transport is in a Brownout (degraded performance) or a Blackout (not able to carry any traffic.

Prefer Higher-Latency Transport—carried by the Higher-Latency transport except when that transport is in a Brownout (degraded performance) or a Blackout (not able to carry any traffic.

ASAP—carried, on a nearly packet-by-packet basis, by the transport which, given the estimated latency for the packet, is expected to deliver the packet with the lowest latency. The estimate is based on criteria like the estimated transport capacities, rate limits and backlogged traffic already queued for transmission at various Classes Of Service (priorities). As the usage knob increases, ASAP traffic is progressively switched away from the Lower-latency Transport.

Classifier (COS)—Classes Of Service

The classifier may establish on an (ActiveQOS priority-level/upstream or downstream) which path (transport) carries an IP flow. The SD-WAN Router and SD-WAN Gateway can assign an IP flow a class of service which may vary over time. Exemplary IP flow's class of service can include (from highest-priority to lowest):

Light-Interactive—where the expected/measured traffic is so light it does not congest a transport. DNS lookups are an example of Light-Interactive Traffic.

Heavy-Interactive Gold, Silver and Bronze—where the expected traffic is interactive (where a human is expected to be waiting on its operation) and is also able be heavy enough to congest a transport.

Bulk Gold, Silver and Bronze—where the expected traffic is expected to be heavy, but where a human is not expected to be waiting on its operation. Software downloads, streaming video after initial startup are examples of Bulk traffic.

Inspector—Deep Packet Inspection Application Categorization

The SD-WAN Gateway may include a deep-packet inspection classifier or Inspector. The Inspector identifies the application a "connection" (TCP or UDP) is carrying and rules can then be used to adjust the policy for carrying the application's upstream (inroute; to subscriber) and downstream (outroute; from subscriber) traffic on a per-usage knob setting basis. An application may be given preference by having a higher knob setting for shifting its to the less responsive higher-latency transport than other applications thereby retaining that application's responsiveness as a subscriber's lower-latency transport usage increases.

Figure 4:
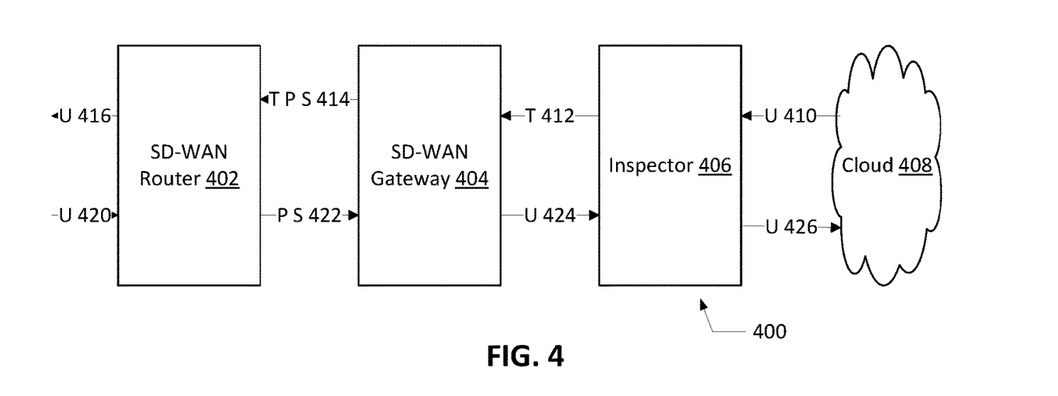
FIG. 4 illustrates a logical view of an integration of an inspector with a SD-WAN router and a SD-WAN gateway, according to various embodiments.

FIG. 4 illustrates a logical view of an integration of an inspector with a SD-WAN router and a SD-WAN gateway, according to various embodiments.

FIG. 4 illustrates a logical view of an integration 400 of an inspector 406 with a SD-WAN router 402 and a SD-WAN gateway 404. After application identification, the inspector 406 classifies IP flows identifying which application they are supporting. This is done by looking at the packet headers, packet sizes and the contents of the packets (e.g. pulling the domain name out of TLS Client Hello messages). The Inspector 406 has an application taxonomy that puts individual applications into application groups. These groups could include groups like: Streaming Video (Youtube, Netflix, etc), Streaming Audio (Spotify, Pandora, etc), Real-Time Multiparty Conferencing (Zoom, Microsoft Teams, etc.), Web Browsing, or the like. In FIG. 4 packets streams 410-426 are marked with a U for untagged packets, a T for tagged packets, a P for prioritized packets and a S for transport selected packets.

Downstream packets 410 arrives from a cloud 408 as untagged to the inspector 406. The downstream packets 410 convey data for IP flows. The inspector 406 may identify IP flows and a respective application for the IP flows within the downstream packets 410. The inspector 406 adjusts, for the identified IP flows, its Application Group. In some embodiments, the inspector 406 DSCP tags individual downstream packets 412 with their application group ID thereby allowing the SD-WAN Gateway 404 to identify a packet's Application Group ID. As such, the individual downstream packets 412 arrive at the SD-WAN Gateway 404 tagged with DSCP tags. The DSCP tags are used by the SD-WAN Gateway 404 to assign COS classification and to select a transport path. As such, the downstream packets 414 to the SD-WAN Router 402 is sent as tagged, prioritized and transport selected.

The SD-WAN Gateway 404 leaves the DSCP tag in place in IP flows and forwards the individual downstream packets 412 thru to the SD-WAN Router 402 via the downstream packets 414. The downstream packets 414 can provide the downstream IP flow's Application Group ID to the SD-WAN Router 402. The SD-WAN Router 402 removes the DSCP tag and downstream packets 416 leave the SD-WAN Router 402 untagged.

Upstream packets 420 are received by the SD-WAN Router 402 untagged. To prioritize and transport select, the upstream packets 420 in upstream IP flows therein, the SD-WAN Router 402 can identify the downstream IP flows received over the downstream packets 414 associated with respective upstream flows. As such, the SD-WAN Router 402 can determine an upstream IP flow's Application Group ID by finding the downstream IP flow that is part of the upstream flow's TCP or UDP connection and tagging the upstream IP flow with the "paired" downstream flow's Application Group ID. The application group ID can be used to prioritize and select transport upstream packets 422 from the SD-WAN Router 402 to the SD-WAN gateway 404. The upstream packets 422 are untagged and may be forwarded to the cloud 408 as upstream packets 424 and upstream packets 426. In some embodiments, the inspector 406 may not be traversed in the upstream packet flow.

Application Group Policies

The SD-WAN Router and SD-WAN Gateway may provide Application Group Policies that support path-preference policies effected by the Usage Knob level. These policies are tuned to progressively reduce Lower-latency usage while lessening the impact on end-user noticeable responsiveness. Application group policies may be based on the application identification performed by the inspector.

For example, the Application Group Policies may shift Web Browsing downstream traffic to a Higher-Latency path preference from either the ASAP or Prefer-Lower-latency policies after startup handshakes have completed and after the start of the HTTPS request after progressively smaller amounts of data. This allows the startup handshakes of HTTPS to continue to be carried by the lower-latency transport and for the smaller URLs within a web page to also be retrieved via the lower-latency transports. This retains web page responsiveness. Moreover, larger URLs are shifted away from the lower-latency transport which reduces Lower-latency usage.

In another example the Application Group Policies may shift Real-Time Multiparty conferencing from ASAP (or prefer lower-latency) upstream and downstream to ASAP or prefer lower-latency upstream and prefer Higher-Latency downstream as the usage knob increases. This has the effect of shifting the bulk of the traffic away from the lower-latency transport as the downstream traffic is typically heavier than upstream, especially when the subscriber is not talking or presenting. It may reduce the impact of the higher-latency transport as multiple access techniques typically subject the upstream direction of the higher-latency transport to higher latency than the statistically multiplexed downstream direction.

Class-Of-Service Policies

For some applications, especially web browsing, the appropriate Class Of Service and Path Preference for an IP flow is better determined by monitoring its (and its paired flow carrying packets in the opposite direction's) traffic including their packet sizes and frequency. The heuristic is that if something is large it probably isn't response time sensitive as it would be unresponsive over lower-speed transports.

The SD-WAN Router and SD-WAN Gateway may include a Classifier that assigns an IP flow with a Class Of Service as a result of its Application Group ID, its port numbers, direction, packet sizes and thruput as it varies over time.

For example, the path preference policies as a function of class of service for lower usage knob settings may be as follows:

- Light Interactive—prefer Lower-latency as this is higher-priority and won't congest the lower-latency transport.
- Heavy Interactive Gold, Silver, Bronze—ASAP for responsiveness.
- Bulk Gold, Silver, Bronze—prefer Higher-Latency for lower usage costs.

For medium-high usage knob settings moving Heavy Interactive Bronze and then Silver to the prefer Higher-Latency path-preference results in reduced lower-latency usage while retaining responsiveness for Heavy Interactive Gold and Light Interactive traffic.

For higher usage knob settings moving heavy interactive downstream traffic further reduces Lower-latency Usage albeit at some loss of responsiveness.

VPN Path Preference Policies

The SD-WAN Router and the SD-WAN Gateway may have a VPN classifier that identifies VPN IP flows and can classify such a flow as being one of: Idle, Interactive, "Interactive And Bulk" or Bulk. In some embodiments, the VPN classifier sets the path preference for a VPN IP flow as a function of its VPN classification, IP flow direction (upstream or downstream) and Usage Knob level.

Typically VPN traffic receives an ASAP policy at low Usage Knob Levels regardless of direction or VPN classification. As the Usage Knob level increases the policy may move idle and bulk VPN traffic to the Prefer Higher-Latency policy. At even higher Usage Knob levels, downstream "Interactive And Bulk" or even Interactive VPN traffic may be moved to the Prefer Higher-Latency policy to even further reduce LTE usage.

Adjusting the transport path preference policy for an IP flow based on a classifier's evaluation of what the flow is carrying at the protocol level and the current usage knob level reducing the amount of traffic carried as the usage knob level increases.

Adjusting a VPN classifier's path preference policy to depend upon the usage knob level reducing the amount of traffic carried as the usage knob level increases.

EMBODIMENTS

A method for traffic shaping a hybrid network site where two transport's usage is monitored and where one of the transport's usage is managed to be close to but under a usage cycle limit by progressively shifting traffic to the other transport as the managed transport usage approaches an on-course boundary which approaches the usage cycle limit at the end of the usage cycle.

A method for traffic shaping a hybrid network site where two transport's path preference policies are adjusted in steps as a function of a usage managed transport's usage proximity to an on-course boundary.

A method for traffic shaping a hybrid network site where two transport's path preference policies include a reduction of a rate limit imposed on a usage managed transport as a function of the usage managed transport's usage proximity to an on-course boundary.

A method for traffic shaping a hybrid network site where two transport's path preference policies include a prefer one transport, prefer another transport or use the estimated lower latency transport where the estimation is based on the estimated transport capacities and the backlog of traffic already queued for transmission and where selected policy for an IP flow depends on the measured usage of one or both of the transports.

A method for traffic shaping a hybrid network site where two transport's path preference policies for an IP flow depend on a deep packet inspector's categorization of the IP flow's application group and the measured usage of one or both of the transports.

A method where a hybrid network site with two transport's path preference policies for an IP flow depend on a classifier's class-of-service classification the IP flow and the measured usage of one or both of the transports.

A method where a hybrid network site with two transport's path preference policies for an VPN IP flow depend on a VPN classifier's VPN categorization of the VPN IP flow's traffic and the measured usage of one or both of the transports.

FIG. 5 is a flowchart of a method for traffic shaping of a hybrid network using IP including a first transport and a second transport, according to various embodiments.

FIG. 5 is a flowchart of a method 500 for traffic shaping of a hybrid network using IP including a first transport and a second transport. At operation 510, the method 500 includes establishing an on-course line to monitor usage of the first transport over a usage cycle, wherein the on-course line defines a usage-limit of the first transport for a given instant within the usage cycle. At operation 520, the method 500 includes tracking a current usage of the first transport over the usage cycle. At operation 530, the method 500 includes determining a preference between the first transport and the second transport based on a property of a traffic to be transported by the hybrid network. At operation 540, the method 500 includes adjusting the preference to shift the traffic to the second transport as a distance of the current usage from the on-course line decreases for a current instant.

FIG. 6 is a flowchart of a method for traffic shaping of a hybrid network using IP including a first transport and a second transport, according to various embodiments.

FIG. 6 is a flowchart of a method 600 for traffic shaping of a hybrid network using IP including a first transport and a second transport, according to various embodiments. At operation 610, the method 600 includes inspecting the downstream packets for the downstream IP flow with a deep packet inspector to determine a category and an application group for the downstream packets. At operation 620, the method 600 includes tagging the downstream packets with a downstream tag based on the category and the application group. At operation 630, the method 600 includes receiving, at a SD-WAN router, a downstream tag for downstream packets of a downstream IP flow. At operation 640, the method 600 includes identifying an upstream IP flow corresponding to the downstream IP flow. At operation 650, the method 600 includes classifying upstream packets of the upstream IP flow with an upstream tag based on the downstream tag of the downstream IP flow. At operation 660, the method 600 includes determining a transport, for transmitting the upstream packets, between the first transport or the second transport based on the upstream tag. At operation 670, the method 600 includes setting a Class-of-Service (COS) classification for the upstream IP flow based on the upstream tag. At operation 680, the method 600 includes determining a transport, for transmitting the upstream packets, between the first transport or the second transport based on the COS classification and measured usages of one or both of the transports.

Having described embodiments of a system and method (which are intended to be illustrative and not limiting), it is noted that modifications and variations can be made by persons skilled in the art considering the above teachings. It is therefore to be understood that changes may be made in the embodiments disclosed which are within the scope of the disclosure as outlined by the appended claims. Having thus described aspects of the disclosure, with the details and particularity required by the patent laws, what is claimed and desired protected by Letters Patent is set forth in the appended claims.

I claim:

1. A method for traffic shaping of a hybrid network using Internet Protocol (IP) comprising a first transport and a second transport, the method comprising:
   establishing an on-course line to monitor usage of the first transport over a usage cycle, wherein the on-course line defines a usage-limit of the first transport for a given instant within the usage cycle;
   tracking a current usage of the first transport over the usage cycle;
   determining a preference between the first transport and the second transport based on a property of a traffic to be transported by the hybrid network; and
   adjusting the preference to shift the traffic to the second transport as a distance of the current usage from the on-course line decreases for a current instant,
   wherein the first transport has a lower latency than a latency of the second transport.

2. The method of claim 1, wherein the first transport is provided by a cellular Wide Area Network (WAN) and the second transport is provided by a satellite WAN.

3. The method of claim 1, wherein the establishing establishes a plurality of knob levels to calculate a distance of the current usage from the on-course line.

4. The method of claim 1, wherein the determining the preference is based on a usage of the first transport.

5. The method of claim 1, wherein the determining the preference is based on one or more of a path selection policy, a Class-of-Service (COS), an application identification, an application group policy, and a COS policy.

6. The method of claim 1, wherein the determining the preference is based on a path selection policy.

7. The method of claim 1, wherein the determining the preference is based on a Class-of-Service (COS) classification.

8. The method of claim 1, wherein the determining the preference is based on a COS policy.

9. The method of claim 1, wherein the determining the preference is based on an application identification.

10. The method of claim 1, wherein the determining the preference is based on an application group policy.

11. The method of claim 1, wherein the hybrid network comprises a first Virtual Private Network (VPN) over the first transport and a second VPN over the second transport, and the determining the preference is based on a VPN path preference policy for the first VPN and the second VPN.

12. The method of claim 1, wherein the adjusting of the preference is based on a knob level determined based on a distance of the current usage from the on-course line.

13. The method of claim 1, wherein the adjusting sets the preference to the second transport when the current usage exceeds the on-course line for the current instant.

14. The method of claim 1, wherein the adjusting the preference comprises adjusting a rate limit of the first transport.

15. The method of claim 1, wherein the adjusting the preference is based on a direction of the traffic.

16. A method for traffic shaping of a hybrid network using Internet Protocol (IP) comprising a first transport and a second transport, the method comprising:
   receiving, at a SD-WAN router, a downstream tag for downstream packets of a downstream IP flow;
   identifying an upstream IP flow corresponding to the downstream IP flow; and
   classifying upstream packets of the upstream IP flow with an upstream tag based on the downstream tag of the downstream IP flow.

17. The method of claim 16, wherein the receiving receives the downstream tag from a SD-WAN gateway.

18. The method of claim 17, wherein the SD-WAN gateway adjusts the downstream tag by:
   inspecting the downstream packets for the downstream IP flow with a deep packet inspector to determine a category and an application group for the downstream packets; and
   tagging the downstream packets with a downstream tag based on the category and the application group.

19. The method of claim 16, further comprising determining a preferable transport, for transmitting the upstream packets, between the first transport or the second transport based on the upstream tag.

20. The method of claim 16, further comprising:
   setting a Class-of-Service (COS) classification for the upstream IP flow based on the upstream tag; and
   determining a preferable transport, for transmitting the upstream packets, between the first transport or the second transport based on the COS classification and measured usages of one or both of the first transport and the second transport.

* * * * *